United States Patent [19]

Moore

[11] Patent Number: 5,365,967
[45] Date of Patent: Nov. 22, 1994

[54] SAFETY TIRE VALVE

[75] Inventor: John C. Moore, Palm Harbor, Fla.

[73] Assignee: Capital Data, Palm Harbor, Fla.

[21] Appl. No.: 145,158

[22] Filed: Nov. 3, 1993

[51] Int. Cl.$^5$ .................... F16K 15/20; F16K 37/00
[52] U.S. Cl. .................... 137/226; 137/227; 137/233; 137/557; 137/559; 73/146.8; 116/34 R
[58] Field of Search ............... 137/223, 226, 227, 228, 137/229, 230, 232, 233, 557, 559; 73/146.3, 146.8; 116/34 R

[56] References Cited

U.S. PATENT DOCUMENTS

| | | | |
|---|---|---|---|
| 1,258,114 | 3/1918 | Hayward | 137/227 X |
| 1,769,508 | 7/1930 | Harned | 116/34 R |
| 2,329,039 | 9/1943 | Fenwick | 73/146.8 |
| 2,417,449 | 3/1947 | Rubin | 73/146.8 |
| 2,505,949 | 5/1950 | De Vilbiss | 137/230 |
| 2,542,414 | 2/1951 | Jansen | 73/390 |
| 2,866,432 | 12/1958 | Laurie, Jr. | 116/34 R |
| 2,938,379 | 5/1960 | Reh | 73/146.8 |
| 2,939,478 | 6/1960 | Dockrell | 137/223 |
| 3,241,514 | 3/1966 | Grimland | 116/34 R X |
| 3,489,167 | 1/1970 | Kilmarx et al. | 137/227 |
| 3,523,451 | 8/1970 | Kohn | 73/146.8 |
| 3,719,198 | 3/1973 | Wilhelm et al. | 137/228 |
| 3,780,693 | 12/1973 | Parr | 73/146.8 X |
| 3,789,867 | 2/1974 | Yabor | 137/227 |
| 3,799,037 | 3/1974 | Schmidt | 92/98 R |
| 3,830,249 | 8/1974 | Fleenor et al. | 137/224 |
| 3,906,988 | 9/1975 | Mottram | 137/227 |
| 3,990,467 | 11/1976 | Sargent | 137/227 |
| 4,244,214 | 1/1981 | Curran | 73/146.8 |
| 4,366,708 | 1/1983 | Warihashi | 73/146.8 |
| 4,445,527 | 5/1984 | Leimbach | 137/226 |
| 4,606,391 | 8/1986 | Achterholt | 137/227 X |
| 4,660,590 | 4/1987 | Sanchez | 137/226 |
| 4,819,686 | 4/1989 | Achterholt | 137/229 |
| 4,945,337 | 7/1990 | Huang | 137/233 X |
| 5,040,562 | 8/1991 | Achterholt | 137/232 X |
| 5,115,832 | 5/1992 | Higdon et al. | 137/227 |

*Primary Examiner*—John Rivell
*Attorney, Agent, or Firm*—Dougherty, Hessin, Beavers & Gilbert

[57] ABSTRACT

A tire pressure indicator which includes a valve stem over-pressure indicator and a valve stem cap under-pressure indicator. The valve stem includes an air porting scheme that releases over-inflation air for escape through a whistling reed configuration. The valve stem cap includes a top translucent panel for coaction with a diaphragm spring contained therebelow. Normal tire pressure distends the diaphragm spring to an upward convex attitude in contact with the underside of the translucent panel to project a visual indicator.

11 Claims, 2 Drawing Sheets

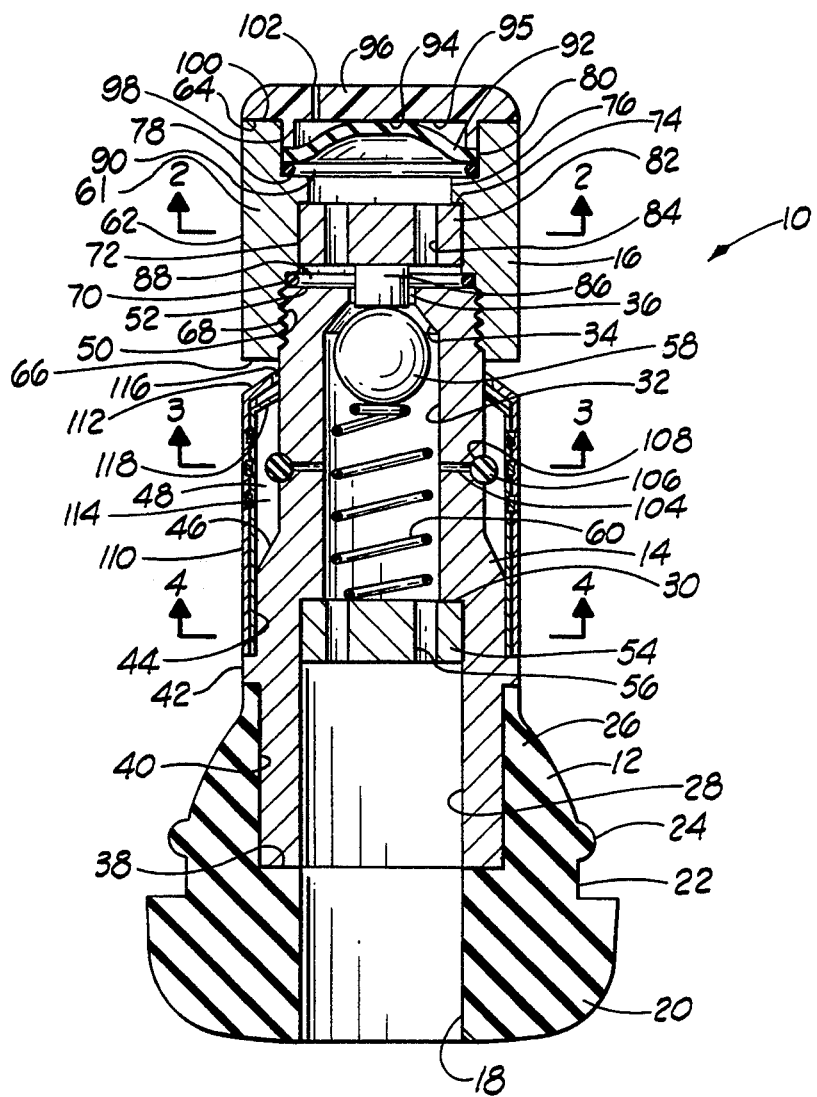
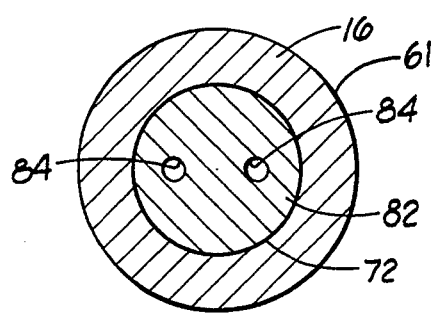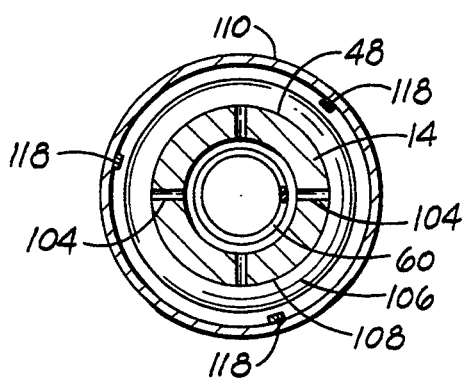
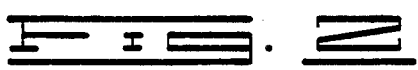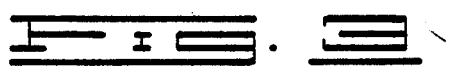

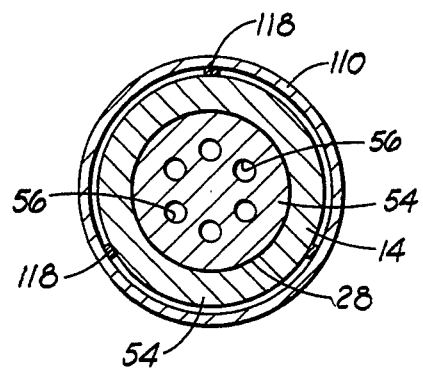
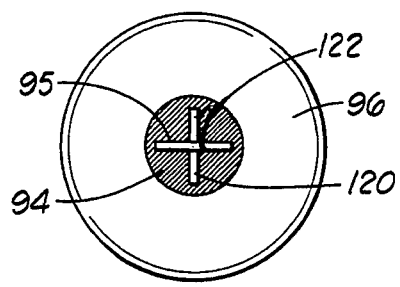 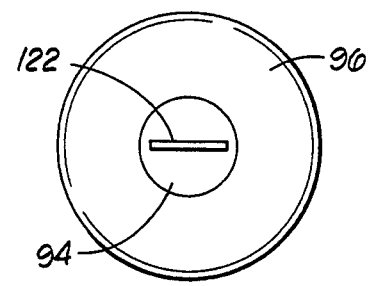
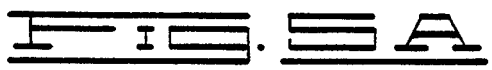 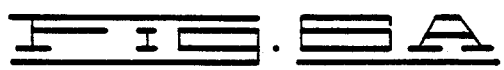
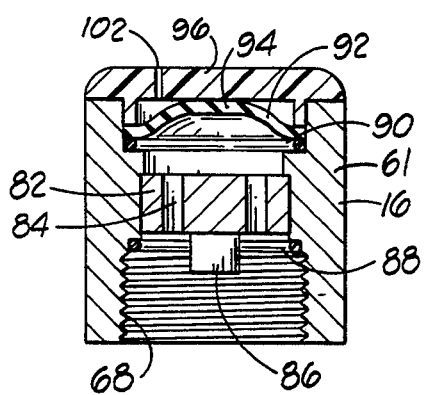 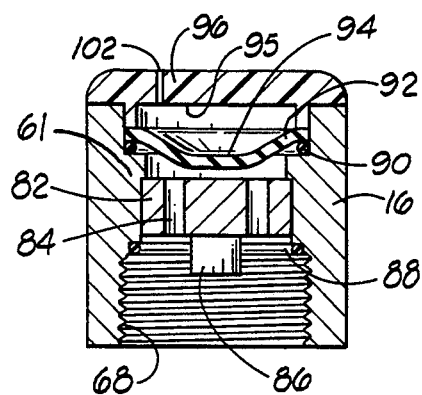
 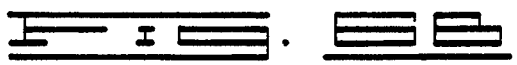

SAFETY TIRE VALVE

BACKGROUND OF THE INVENTION

1. Field of the Invention

The invention relates to automatic low pressure tire indicator assemblies and, more particularly, but not by way of limitation, it relates to an improved method and apparatus for sensing and indicating low tire pressure.

2. Description of the Prior Art

The prior art includes a great number of indicating devices that warn of pressure drop in pneumatic tires, and such tire aids have developed over a long number of years. A U.S. Pat. No. 4,819,686 teaches a valve cap adaptation which shows visually any appreciable tire pressure drop by using a deflectable diaphragm that moves in response to a reference air pressure toward a compartment having existing tire pressure, and the moving diaphragm provides a visual indication within a transparent housing portion of the valve cap. A U.S. Pat. No. 2,866,432 also teaches a movable diaphragm type of indicator which may be detachably secured to a valve stem for subsequent actuation manually to indicate by sound, sight or touch whether or not the pressure within the tire is equal to or above the required amount.

A U.S. Pat. No. 4,244,214 is of interest in that it describes a device that includes an axially apperturned bolt that is movably mounted within a visual tire valve with respect to an indicating window. The bolt includes a series of different color bands which show a gradation in tire pressure. Also, U.S. Pat. No. 3,990,467 is of interest for its capability of indicating tire air pressure by color whenever the tire is under or over inflated. Finally, a U.S. Pat. No. 3,830,249 is cited for its ability to give audible indication of over pressure situations; that is, when the tire receives additional inflation pressure, it makes an audible sound while surplus air is being discharged down to a recommended pressure level.

SUMMARY OF THE INVENTION

The present invention relates to improvements in construction of tire pressure indicating devices of the type that are disposed in the valve stem and valve cap. A usual type of valve stem having an axial air passage includes a valve consisting of a closure ball that is maintained seated by a compression spring within the axial airway. The valve cap then includes an axial passage with an air distributor that also includes an axial foot member for depressing the valve ball to allow minimal air flow. The cap axial passage is closed by means of a diaphragm that is movable toward and away from a transparent indicator panel that also includes an air relief port. The valve stem includes a circumferential array of radial air flow ports which are closed by means of a seated O-ring that is normally closed over the ports in the presence of normal or lesser interior tire pressure. The O-ring is distended by over-pressure to allow air flow through the radial ports for escape past sound vibration reeds to produce an audible noise as excess air escapes and the tire returns to normal pressure.

Therefore, it is an object of the present invention to provide an economical and highly dependable valve stem tire pressure indicator.

It is also an object of the present invention to provide a tire pressure indicator that may be easily and quickly read for indication of a low pressure condition.

It is still further an object of the invention to provide a pressure indicator that provides audible indication of over inflation and effects return to normal pressure.

It is yet another object of the present invention to provide such a tire pressure indicator device that may be readily installed in the wheels of existing automotive vehicles.

Finally, it is an object of the present invention to provide a device that may be utilized on any vehicle to extend automotive life and dependability.

Other objects and advantages of the invention will be evident from the following detailed description when read in conjunction with the accompanying drawings which illustrate the invention.

BRIEF DESCRIPTION OF THE DRAWINGS

FIG. 1 is a vertical cross section of the tire inflation indicator of the present invention;

FIG. 2 is a section taken along lines 2—2 of FIG. 1;

FIG. 3 is a section taken along lines 3—3 of FIG. 1;

FIG. 4 is a section taken along lines 4—4 of FIG. 1;

FIGS. 5A and 5B are a vertical cross section of the valve cap when a tire is properly inflated coupled with the indicating view shown on the top panel; and FIG. 6A and 6B are a vertical cross section of the valve cap when the tire is in the under inflated condition coupled with the adverse indication shown on the top panel of the valve cap.

DETAILED DESCRIPTION OF THE INVENTION

Referring to FIGS. 1-4, a safety tire valve 10 consists of a valve base 12 molded in support of a valve stem 14 which receives a cap 16 securely threaded thereon. The base 12 is formed from a suitable elastomer and includes an axial bore 18 having a rounded plug bottom 20 rising upward to define an annular groove 22 beneath a bead 24 and upper shoulder portion 26. The bead 24 allows the base 12 to be forced through a hole in the wheel rim so that it is firmly seated within the annular groove 22.

The valve stem 14 consists of a generally cylindrical body that includes a lower end having an axial bore 28 leading up to an annular shoulder 30 and extending into a counterbore 32 that terminates at the top in a 45° shoulder 34 and a narrower bore 36. Valve stem 14 has an annular bottom surface 38 and lower cylindrical side wall 40 extending upward to an annular ring formation 42. Extending from ring formation 42 is cylindrical sidewall 44 leading through an annular, sloping shoulder 46 to a lesser diameter sidewall 48 that terminates at the upper end with threads 50 and upper annular surface 52.

The upper end of base 12, i.e., the support shoulder 26, is suitably bonded around the bottom surface 38 and lower side wall 40 of valve stem 14 in such manner as to provide a very secure and rugged interconnection. An air distributor 54 having a plurality of air ports 56 formed vertically therethrough is seated upward within lower bore 28, and distributor 54 is fastened therein as by forcing, brazing or the like. See also FIG. 4 which shows the plan layout of air distributor 54 and the vertical air ports 56 relative to the valve stem 14 and lower axial bore 28. A stop ball 58 is disposed in the upper bore 32 as it is continually urged upward to seal against the sloped shoulder 34 by means of a compression spring 60 that is seated down against the air distributor 54.

Valve cap 16 consists of another body of revolution, the valve cap having 61 having an outer side wall 62 with upper and lower annular surfaces 64 and 66, respectively. A lower threaded counterbore 68 is formed concentric to bottom part 66 for secure, mating engagement with outer threads 50 of valve stem 14. An annular groove 70 leading upward to a counterbore 72 extends up to an annular shoulder 74 defining an inner bore 76. Leading upward from inner bore 76 there is formed another annular shoulder 78 and an upper bore 80 leading to upper surface 64.

An upper air distributor 82 (shown also in FIG. 2) is formed as a generally flat cylinder having oppositely disposed vertical ports 84 formed therein. The upper air distributor 82 includes a cylindrical axial foot member 86 formed on the underside for the purpose of disengaging the stop ball 58 to allow a small air clearance around sloped shoulder 34 when the valve cap 16 is screwed firmly into operative position, as will be further discussed below. The upper air distributor 82 is seated and secured against annular shoulder 74 within upper cylindrical wall 72 by welding, brazing or other suitable means. A suitable O-ring 88 is urged to seal against upper surface 52 of valve stem 14 by the shoulder groove 70 when valve cap 16 is secured. See also FIGS. 5B and 6B.

The upper end of valve cap 16 includes a sealing O-ring 90 seated on annular shoulder 78 with a diaphragm spring 92 seated thereon. Spring 92 normally extends a central portion 94 to urge against a lower surface 95 of a translucent, e.g., smokey plastic, indicator cap 96. The indicator cap 96 includes an annular lower rim 98 and bottom annular surface 100 which may be secured and bonded adjacent respective upper bore 80 and upper annular surface 64. The lower rim 98 holds the diaphragm spring 92 securely in place against O-ring 90. A very small orifice 102 is formed through the indicator cap 96 in communication with the diaphragm spring 92 to allow pressure equalization. The diaphragm spring 92 is preferably colored red with a line etched thereon so that, in normal pressure situations, the red portion will touch the indicator cap 96 (FIG. 5A) and the viewer will see the color red with a plus sign showing, as will be further described.

As shown also in FIG. 3, the mid-portion of valve stem 14 in the area of outer wall 48 includes a plurality, e.g., four, lateral ports 104 which are sealed over by a selected strength sealing O-ring 106 that is seated within a semi-circular annular seating groove 108. The O-ring 106 is selected to be of a distension strength that permits air release through ports 104 only at selected over-pressure situations. A cylindrical metal jacket 110 having annular shoulders 112 closing around the upper outer surface 48 defines an annular air collection chamber 114 which contains any air escaping through the lateral ports 104. A plurality, e.g., three, air escape ports 116 are disposed equi-distantly around the shoulders 112 adjacent outer surface 48 to allow over-pressure air flow, and respective reeds 118 are secured adjacent each of the air ports 116 to provide an audible sound such as a whistling sound during times of air release.

In operation, the safety tire valve 10 is installed by snapfitting the base 12 into the hole formed in the wheel rim (not shown). Thus, the annular groove 22 is force-fit into the rim hole where it is seated around groove 22 and held firmly in place by the annular bead 24. The tire can then be inflated with cap 16 unscrewed and removed from the valve stem 14 so that the air supply nozzle can be placed directly over upper surface 52 and down around the threads 50 of the valve stem 14. In accordance with conventional structure, a nozzle member (not shown) forces the stop ball 58 downward to open up the axial hole 36 of valve stem 14 whereupon air under pressure flows through the holes 56 of air distributor 54 and through bores 28 and base bore 18 to the interior of the tire. When the over-pressure condition is reached within the tire, air flows through the lateral ports 104 of valve stem 14 to escape around the regulator O-ring 106 into chamber 114, and air from chamber 114 escapes through the ports 112 adjacent reeds 118 to make a whistling sound so long as over-pressure condition endures. When the air pressure equalizes to that which is the standard for the particular tire, the O-ring 106 once again seats within annular groove 108 to cease air escape and the tire is fully functional. The O-ring 106 is selected to be of a size and elasticity sufficient to maintain the rated air pressure for the particular tire.

After inflation, with the air source nozzle removed, the valve cap 16 may be firmly screwed onto the valve stem 14 and seated along the entire length of threads 50. At this time, the axial foot 86 beneath upper air distributor 82 depresses the stop ball 58 very slightly to provide a small annular clearance upward through bore 36 so that air at the inner tire pressure communicates through ports 84 to distend the diaphragm spring 92 upward against the indicator cap 96. See FIGS. 5A and 5B.

When the tire is properly inflated, and internal air pressure maintains diaphragm spring 92 distended up against the lower surface 95 of indicator cap 96, there is a sight indication on the upper face of indicator cap 96 in the form of a red background with a plus sign showing in the middle. The plus sign is formed by virtue of the fact that there is a line 120 etched on the top, central surface 94 of the red diaphragm spring 92 which interacts in visual effect with a crossed line 122 etched on the underside 95 of indicator cap 96. This is apparent from the combination views of FIG. 5 FIGS. 5A and 5B which shows the red plus sign by virtue of etch line 120 on top portion 94 of red-colored diaphragm spring 92 combined with an etch line 122 that is formed centrally on the bottom surface 95 of indicator cap 96.

When the tire becomes under inflated, the pressure reduction within the tire will be seen through the valve stem and upper air distributor 82 such that the diaphragm spring 92 will return downward to a low pressure position as shown in FIGS. 6A and 6B. The seepage air port 102 allows pressure adjustment above the diaphragm spring 92 to allow the reversal, and this also results in the drawing of the diaphragm spring center portion 94 away from the underside 95 of indicator cap 96 with only a clear image negative sign showing to the observer. That is, only the etch line 122 continues to show through the indicator cap 96 and the lower indicia carried by diaphragm spring 92 is out of view.

The foregoing discloses a novel form of safety valve stem with visual indicator that enables continual surveillance of vehicle tire condition thereby to avoid excessive wear and damage during under inflation periods. The device is a very simple design that accomplishes all of the requisite functions, yet is an extremely reliable form of structure that is not subject to minor misadjustments and bothersome failures.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A pressure indicator device for air-inflated vehicle tires, comprising:
   a valve stem for receiving air under pressure;
   a check actuator for closing the valve stem and preventing reverse flow of said air;
   a valve cap housing having an open axial portion and being sealingly secured on said valve stem;
   a translucent panel secured across the top of said valve cap housing open axial portion;
   a diaphragm spring normally downwardly convex secured across said valve cap housing axial portion, said spring being round and uniformly thick with a colored upper surface having a line etched thereon to provide visual indication when in engagement with said translucent panel; and
   air distributor means secured across said open axial portion below said diaphragm spring and including a foot member for urging the check actuator open to permit normal inflation air pressure communication into the valve cap housing open axial portion;
   whereby the normal inflation air pressure distends the diaphragm to an upwardly convex position in contact with the translucent panel to provide visual indication.

2. A pressure indicator device as set forth in claim 1 wherein the check actuator comprises:
   a stop ball; and
   a compression spring seated within the valve stem to urge the stop ball toward closure position.

3. A pressure indicator device as set forth in claim 1 wherein said translucent panel comprises:
   a plastic disc;
   a vent hole therethrough; and
   a line etched on the lower surface of said disc that is transverse to the etched line on the diaphragm spring so that normal inflation pressure causes a plus sign indication when viewing said translucent panel.

4. A pressure indicator device as set forth in claim 1 wherein said air distributor means comprises:
   a cylindrical plate having at least one air flow port formed therethrough; and
   an axial extension disposed to extend downward as said foot member.

5. A pressure indicator as set forth in claim 4 wherein said diaphragm spring comprises:
   a round, uniformly thick spring having a colored upper surface portion for engagement with the translucent panel to provide visual indication; and
   a line etched on said colored upper surface portion.

6. A pressure indicator device as set forth in claim 5 wherein said translucent panel comprises:
   a plastic disc;
   a vent hole therethrough; and
   a line etched on the lower surface of said disc that is transverse to the etched line on the diaphragm spring so that normal inflation pressure causes a plus sign indication when viewing said translucent panel.

7. A pressure indicator device as set forth in claim 1 which is further characterized to include:
   a first O-ring disposed to seal between the valve cap housing and said valve stem; and
   a second O-ring disposed to seal between the seated diaphragm spring and said valve top housing.

8. A pressure indicator device as set forth in claim 1 which is further characterized to include:
   plural exhaust ports through the valve stem at a point below said check actuator;
   pressure sensitive closure means closing said exhaust ports at below normal tire inflation pressures;
   an air jacket disposed around said valve stem to receive any air from said exhaust ports;
   plural air vents formed in said air jacket; and
   plural reeds secured adjacent to each of said plural air vents to cause a whistle alarm when tire inflation exceeds normal pressure.

9. A pressure indicator device as set forth in claim 8 wherein said pressure sensitive closure means comprises:
   a groove formed around said valve stem and intersecting each of said plural exhaust ports; and
   an O-ring of preselected distension resistance seated in said groove and being distendable to release pressurized air when the tire inflation air pressure exceeds the normal.

10. A pressure indicator device as set forth in claim 1 which further includes:
    exhaust porting means through the valve stem at a point below said check actuator;
    pressure sensitive closure means closing said exhaust porting means at below normal tire inflation pressures; and
    an air jacket including vented reeds secured around said valve stem to receive air from said exhaust porting means and to cause a whistle alarm when tire inflation exceeds normal pressure.

11. A pressure indicator device as set forth in claim 10 wherein said pressure sensitive closure means comprises:
    a groove formed around said valve stem and intersecting said exhaust porting means; and
    an O-ring of preselected distension resistance seated in said groove and being distendable to release pressurized air when the tire inflation air pressure exceeds the normal.

* * * * *